May 12, 1959 R. J. REEK 2,886,639

CODE CONVERTER

Filed Oct. 25, 1955 3 Sheets-Sheet 1

INVENTOR
ROBERT J. REEK

BY Emery Robinson
ATTORNEY

May 12, 1959 R. J. REEK 2,886,639

CODE CONVERTER

Filed Oct. 25, 1955 3 Sheets-Sheet 2

INVENTOR
ROBERT J. REEK

BY Emery Robinson
ATTORNEY

INVENTOR
ROBERT J. REEK
BY Emery Robinson
ATTORNEY

United States Patent Office 2,886,639
Patented May 12, 1959

2,886,639

CODE CONVERTER

Robert J. Reek, Bellwood, Ill., assignor to Teletype Corporation, Chicago, Ill., a corporation of Delaware Application October 25, 1955, Serial No. 542,735
7 Claims. (Cl. 178—26)

Figure 1:
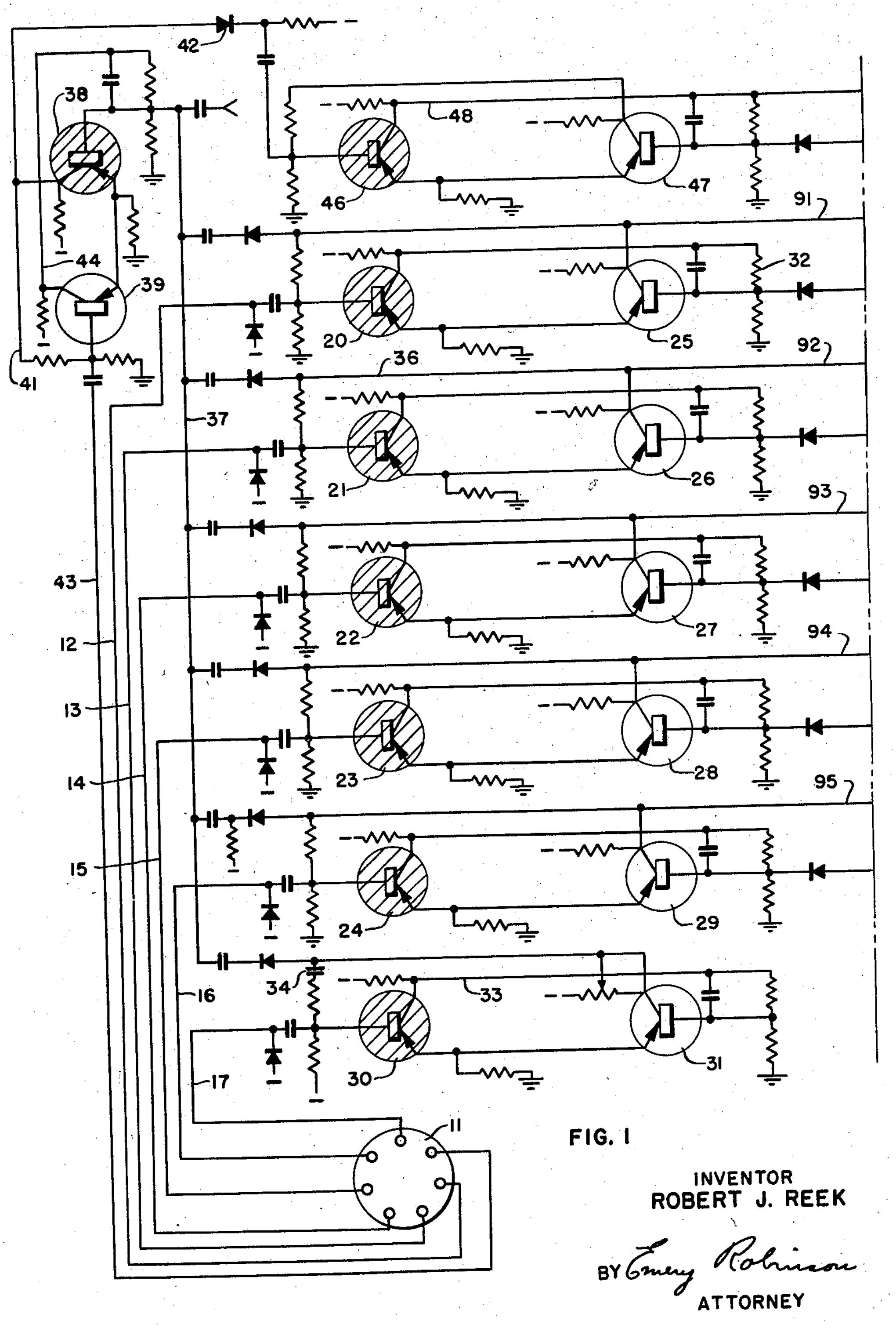

This invention relates to coded signal converters and more particularly to a transistor controlled apparatus for adding start-stop impulses to a signal that comprises a permutatively arranged series of current and no current impulses.

The great majority of terminal recording equipment used in telegraph systems is operated in accordance with the receipt of the so-called start-stop Baudot signals. Each of these signals consists of a start (no current) impulse followed by a fixed number of permutatively arranged marking (current) and spacing (no current) impulses, plus a stop impulse which is usually another current impulse. However, when transmitting signals from one location to another it is usually desirable to eliminate the start and stop impulses thereby saving valuable line time. In these systems the start and stop impulses are added to each signal at the local receiving station. Heretofore these start and stop impulses have been added at the local station by either mechanically or electronically driven converters. These converters have in general proved quite satisfactory, but are subject to several limitations among which are the need for many diverse adjustments on a rather frequent schedule, the difficulty in ascertaining the location of defective components, relatively large space requirements and in the case of mechanical apparatus the attainable speed of operation is rather limited.

An object of this invention is to provide a compact transistorized converter for adding start and stop impulses to coded signals.

A further object of this invention resides in a code converter having durable components arranged to permit rapid location of defective elements.

An additional feature of this invention is the provision of a transistor distributor operated by a start-stop transistor oscillator upon operation of an electric gate which gate is held open during a single cycle of operation of the distributor.

In concordance with the last objective it is a further objective of this invention to render said gate nonoperative after the distributor has executed a single cycle of operation.

A further feature of this invention resides in a code converter having facilities therein for generating a start impulse to precede a series of coded signal impulses which are subsequently generated in a series of mixer devices.

A still further feature of this invention is the provision of a plurality of mixer components for generating a coded signal plus a stop impulse in accordance with a series of stored coded signal impulses and the operation of a distributor.

With these and other objectives in view the present invention contemplates a code converter having a series of gated mixer components which are under the cojoint control of a group of storage devices actuated by a series of signal impulses and a start-stop transistor controlled multi-stage distributor. Presence in the storage device of a coded signal and an application of an operating pulse effects the release of a gate circuit to permit a start-stop oscillator to commence operation. Output pulses from the oscillator are applied to drive the distributor through a single cycle of operation. As the first stage of the distributor is placed in an operating condition a start impulse is imparted to an outgoing signaling channel. Thereafter the operation of the various stages of the distributor in conjunction with stored signal impulses in the storage device cause the mixer components to succeedingly control the signal condition impressed on the outgoing signaling channel. When the last stage of the distributor is operated, a stop impulse condition is impressed on the outgoing signaling channel. Further, when the last stage of the transistor distributor is operated, a potential is developed and supplied to hold the oscillator control gate in a cutoff condition thereby precluding repetitive operation of the distributor until such time as another signal is stored and another operating pulse is available.

In the system to be hereinafter described the received coded impulses are always accompanied by a control impulse which serves the purpose of distinguishing a signal representative of a "blank" function from an idle condition. The invention provides means for automatically removing this control impulse from the signal generated by the code converter. However, the invention provides facilities for causing the code converter to execute a cycle of operation when said "blank" signal is received to thereby generate a start-stop signal representative of a "blank" function.

Figure 2:
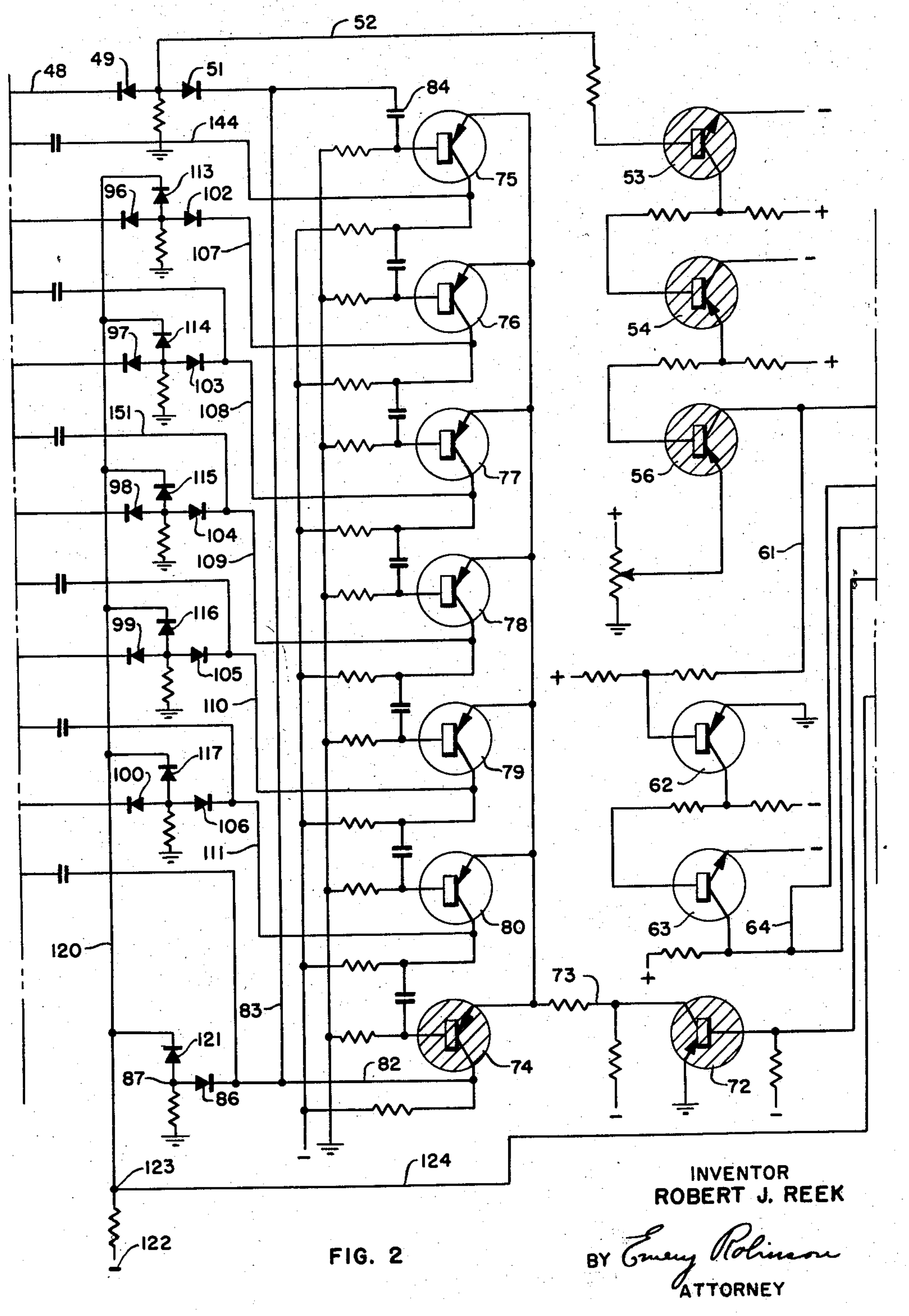
Figures 3, 4, 5:
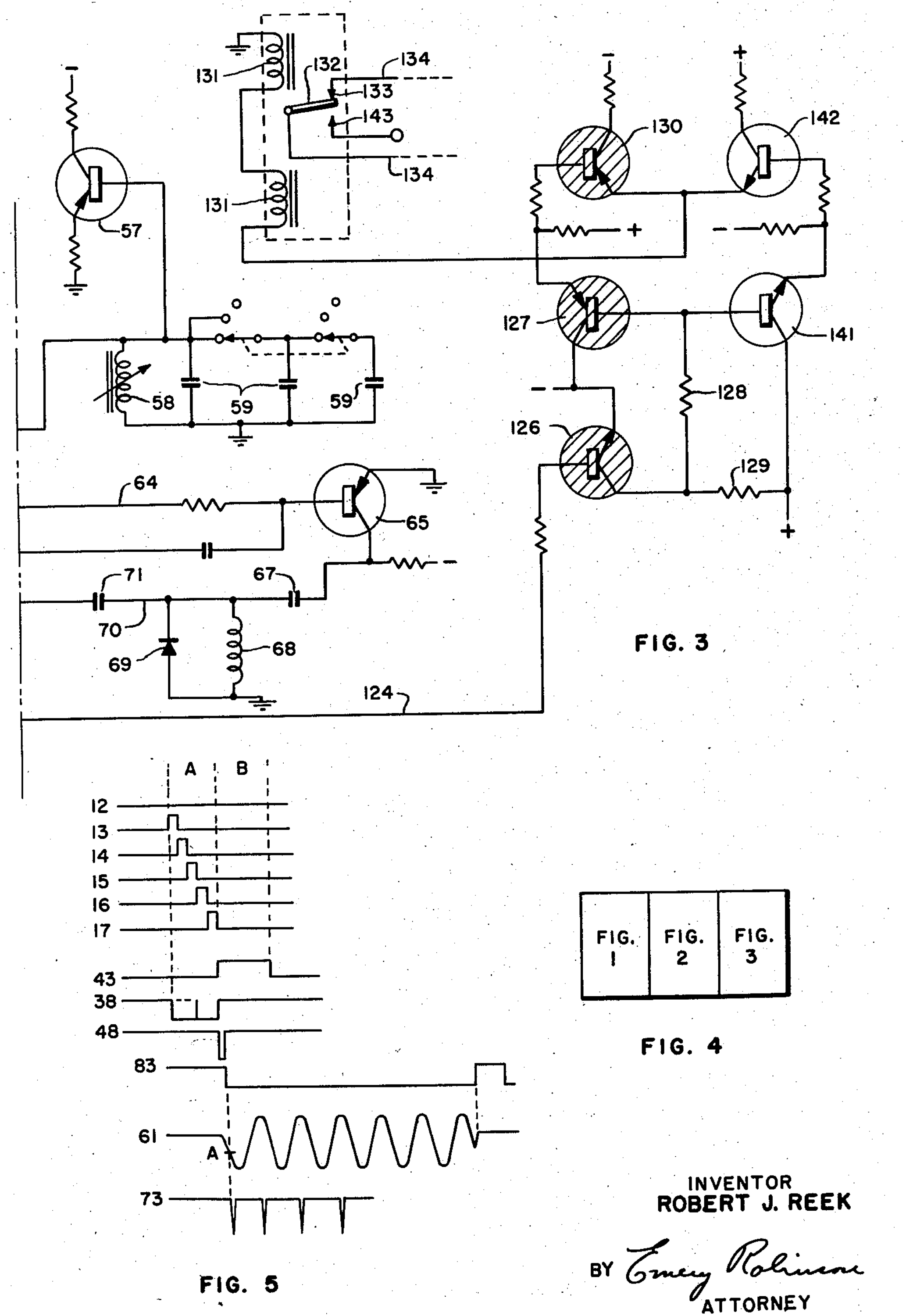

Other objects and advantages of the present invention will be apparent from the following detailed description when considered in conjunction with the accompanying drawings wherein:

Figs. 1, 2 and 3 when assembled in the manner indicated in Fig. 4 illustrates a transistorized code converter embodying the principal features of the present invention; and Fig. 5 is a timing diagram illustrating various operating potentials.

In the following description reference will be made to several types of transistors; namely, the N and P types of point contact and junction transistors. The theory of operation and construction of these transistors are set forth in the patents to Bardeen et al., No. 2,524,035, dated October 3 ,1950, and W. Shockley, No. 2,569,347, dated September 25, 1951.

Each point contact transistor described in the Bardeen et al. patent consists of a semi-conducting body which may consist of a germanium or silicon crystal having emitter and collector electrodes in rectifying contact therewith. In addition a base electrode is in low resistance contact with the crystal. For operation as an amplifier it is necessary that a bias voltage in a forward direction be impressed between the emitter and base while a bias voltage in the reverse direction is applied between the collector and base. If the crystal is of the N type, the emitter should be positive with respect to the base while the collector should be negative with respect to the base. When the crystal is of the P type the operating potentials must be reversed.

The junction transistors are disclosed in the patent to Shockley and as therein described consist of a body of semi-conductive material divided into three zones. A zone of one conductivity, N or P, is positioned between and contiguous with two zones of the opposite conductivity type. Emitter and collector electrode connections are made respectively to the outer zones, and a third connection, by a base electrode, is made to the intermediate zone. If this transistor is of the N–P–N or P type and has a large positive potential on its collector and a small positive bias on its emitter then a relatively large positive current will flow out of the semi-conductor body. If the transistor is of the P–N–P type and the polarities of applied potentials are reversed, then currents in opposite direction to those previously mentioned will flow.

With Figs. 1, 2 and 3 assembled in the manner indicated in Fig. 4, there is shown in Fig. 1 a connector 11 adapted to be associated with a connector in a multiplex receiving distributor of the type shown in the patent to T. A. Hansen, No. 2,609,451, dated September 2, 1952, wherein said connector is designated by the reference numeral 2003. It is understood that the connector 11 could also be associated with other multiplex receiving distributors, the only requirement being that such multiplex equipment will supply a series of permutatively arranged coded impulses plus a control impulse and an operating pulse. As described in the Hansen patent, a series of signal impulses are generated which are applied through connector 11 shown in Fig. 1 of the instant disclosure to a group of leads 12, 13, 14, 15, and 16 together with a positive control impulse which is applied over a lead 17. In Fig. 5 a representative signal is illustrated as being applied from a channel of a multiplex distributor to the leads 12 to 17. Each of the leads 12 to 16, inclusive, run to a bistable storage device which consists of a pair of junction transistors. These transistors are of the N type and are designated by the reference numerals 20 to 29, inclusive. The lead 17 runs to a one shot multivibrator which consists of a pair of N type junction transistors 30 and 31.

Each of the transistors 20 to 24, inclusive, has its collector connected to a source of negative battery and its emitter connected through a resistance to a ground potential. The base of each of these transistors is connected to a source of negative potential which is derived from the collector of the associated transistors 25 to 29. The base is at a lower potential than the emitter potential, consequently the transistors 20 to 24, inclusive, are in a conductive state. In a similar manner the transistor 30 has its electrodes connected to sources of potential which render it normally conductive.

When a signal is applied through connector 11 the appearance of a spacing condition (no potential) on lead 12 (see also Fig. 5) does not affect the conductivity of the transistor 20. If a marking (positive potential) condition is impressed on lead 12 then the potential on the base of transistor 20 rises to drive the base more positive with respect to its emitter, thereby shutting this transistor off. Upon transistor 20 being shut off, its collector potential drops and this drop in potential is impressed through a coupling resistance 32 to the base of the transistor 25 to drive the base negative with respect to its emitter, thus rendering the transistor 25 conductive. If the transistor 25 assumes a conductive condition its emitter potential drops and due to the coupling between emitter electrodes of the transistors 20 and 25, the transistor 20 is precluded from reoperating when the marking condition is removed from the lead 12. As signal impulses representative of either a marking or spacing condition are impressed on the other leads 13, 14, 15 and 16 the respective bistable devices associated therewith are accordingly operated. It may thus be appreciated that the bistable devices are operated in a positive fashion in accordance with the received signal impressed over the leads 12 to 16.

The receipt of the control impulse over the lead 17 which is invariably a positive impulse drives the base of transistor 30 in a positive direction to cause this transistor to assume a nonconductive condition. As the transistor 30 assumes the nonconductive state the collector potential thereof drops to impart a negative going impulse over a lead 33 to the base of the transistor 31. As the base of transistor 31 is driven negative with respect to its emitter the transistor assumes a conductive state. The change in collector potential on transistor 31 acts to discharge a timing capacitance 34. After a time delay determined by the RC values of the capacitance 34 and the various resistances in and connected to the one shot multivibrator, the base of the transistor 30 again assumes a negative value with respect to its emitter to cause this transistor to again resume the conductive condition. Upon transistor 30 becoming conductive its collector potential rises thereby effectuating a rise in potential on the lead 33 to drive the base of the transistor 31 positive with respect to its emitter to shut transistor 31 off.

Assume for purposes of illustration that a marking condition has been impressed on lead 13 to shut transistor 21 off and render transistor 26 conductive, then upon transistor 26 being rendered conductive its collector potential rises. This rise in collector potential is impressed over a lead 36, through a common bus lead 37 to the base of the normally conductive transistor 38. Transistor 38 together with a transistor 39 form another bistable circuit which serves the purpose of recognizing the presence of a character stored in the transistors 20 to 31, inclusive. The appearance of an increased potential on the base of transistor 38 causes this transistor to assume a non-conductive state thereby causing its collector potential to drop (see also line 38 in Fig. 5 which represents the potential on the collector of transistor 38). The drop in collector potential of transistor 38 is reflected over a coupling lead 41 to the base of the normally nonconducting transistor 39. Transistor 39 thereupon assumes a conductive condition. The drop in potential on coupling lead 41 is also imparted to a rectifier diode 42, but inasmuch as it is a negative going pulse it does not pass through the diode 42.

As described in the afore-identified Hansen patent, each signal associated with each channel is followed by the generation of an operating pulse within the receiving distributor. This operating pulse (see line 43 in Fig. 5 which represents the potential on lead 43) which is in a positive direction and is applied through the connector 11 over a lead 43 to the base of the now conducting transistor 39, whereupon said transistor assumes its normal nonconducting condition. Immediately thereupon the collector potential of transistor 39 drops to impress a negative going pulse over a coupling lead 44 to drive the base of transistor 38 negative with respect to its emitter thereby again restoring transistor 38 to its normal conductive state. Resumption of conduction of transistor 38 is accompanied by a rise in its collector potential (see line 38, Fig. 5) which is impressed on the diode 42 in a forward direction, hence rendering the diode conductive to permit the passage of this positive going pulse.

The potential due to the passage of the pulse through diode 42 is impressed on a base of a transistor 46 which is normally in a conductive state. Transistor 46 together with a transistor 47 form another bistable circuit similar to that previously described with respect to the storage devices, thus the rise in potential on the base of transistor 46 places this transistor in a nonconductive condition which is followed by the rendition of the transistor 47 into a conductive state. The drop in collector potential due to transistor 46 assuming a nonconductive condition is also impressed on a lead 48 (see Fig. 5 wherein line 48 represents the potential on lead 48) to one side of a diode 49. Diode 49 together with a diode 51 form a so-called "and" gate; that is, the potential of the junction point between the two diodes is dependent upon application of voltages at the two inputs. In this case, the junction always assumes a potential which is equal to the lowest potential applied to either of said diodes. Consequently, when the potential on lead 48 drops, the potential on the junction point between the diodes also drops to this new value. The junction point between the diodes is coupled by a lead 52 to the base of a normally conductive P type junction transistor 53. As indicated at the beginning of the detailed description, the driving of a base of a P type transistor negative with respect to its emitter causes said transistor to assume a nonconductive condition. Thus the drop in potential on lead 52 drives the base of transistor 53 negative with respect to its emitter to render the transistor nonconducting. The collector of transistor 53 is coupled to the base of a normally conducting N type junction transistor 54; manifestly, the rise in collector potential of transistor 53, due to transistor 53 being cut off, is impressed on the base of transistor 54 to effectuate a shutting off of this transistor.

The emitter of transistor 54 is, in turn, coupled to the base of an emitter follower junction transistor 56 which is of the N type and normally conducting. When transistor 54 is shut off, its emitter potential rises to a positive value to cause the base potential of the transistor 56 to rise whereupon said transistor assumes a nonconducting state.

Positioned to the right of transistor 56 (see Fig. 3) is an oscillator which consists of an N type point contact transistor 57 having, connected in its base circuit, a resonant circuit consisting of inductance 58 and capacitances 59. A point contact transistor having negative resistance characteristics and a resonant circuit connected in its base will function as an oscillator in the manner well known in the art. Transistor oscillator 57 is precluded from operation by the normally conductive transistor 56 which provides a low impedance shunt circuit for the resonant circuit connected to the base of the transistor 57. With the transistor 56 in the normal conductive state, a charging circuit is completed through the transistor to the capacitances 59 and then to ground. The appearance of a slight positive charge on the upper plates of the capacitances 59 provides an advantageous feature in that when said shunt circuit through transistor 56 is released, the positive charge on capacitances 59 is dissipated through the inductance 58 to cause the first output oscillation from the oscillator to be in a negative direction and also causes the oscillation to be of a magnitude equal to the maximum magnitude of oscillations to which the oscillator is capable of producing. It may be thus appreciated that when the transistor 56 is shut off, the shunt circuit associated with transistor 57 is removed, consequently the oscillator will impress an output sinusoidal varying potential wave (see line 61 in Fig. 5 which represents the potential on lead 61) over a lead 61. Values are selected for the resonant circuit to insure that the oscillator produces an output wave whose frequency is equal to the desired frequency of signal impulses that are to be transmitted by the code converter.

When the first negative going wave impressed on lead 61 reaches a value such as indicated in Fig. 5 by point A on a wave form denoted by line 61, a base of an N type junction transistor 62, connected to lead 61, is driven negative with respect to its emitter to place this transistor in a conductive condition. Conduction of transistor 62 is accompanied by a rise in its collector potential which rise is impressed on a base of a P type junction transistor 63 thereby causing this transistor to assume a conductive condition. Conduction of transistor 63 causes its collector potential to drop which drop is impressed over lead 64 to the base of an N type junction transistor 65. Appearance of a decreased potential on the base of transistor 65 places this transistor in a conductive condition. Transistors 62, 63, and 65, are provided for the purpose of amplifying and squaring the output of the transistor oscillator 57.

The positive going pulse produced by the operation of the transistor 65 is applied to a resonant ringing circuit consisting of capacitances 67 and 71 and inductance 68. The application of a pulse to this circuit would normally produce oscillation therein, however, the inductance 68 is shunted by a rectifier diode 69 to prevent pulses going below ground potential. The output of the ringing circuit which is in the form of a single short positive going pulse is applied over a lead 70, through a coupling capacitance 71 to the base of a normally conducting transistor 72. The appearance of increased potential on the base of the N-type transistor 72 renders this transistor momentarily nonconducting whereupon its collector potential immediately drops to impress a negative going pulse over a lead 73 (see line 73, Fig. 5 which represents the potential impressed on lead 73) to the emitter of a normally conducting N type point contact transistor 74.

Transistor 74 is included in the last stage of a multistage distributor. This distributor has seven stages and each stage consists of a transistor which is coupled to the succeeding transistor in the next stage. Transistors of the same type which are provided in the other stages are designated by the reference numerals 75 to 80, inclusive. It will be noted that only one transistor is rendered conductive at any one time due to the common emitter connection. A complete description of the specific circuitry associated with each transistor and the manner of interconnection is set forth in great detail in the copending application of R. A. Slusser, Serial No. 349,637, filed April 20, 1953. As set forth in this copending application, the multistage ring type distributor operates by having a normally conductive transistor rendered nonconductive whereupon a pulse is generated to operate the next succeeding transistor.

The appearance of a negative going pulse on the emitter of transistor 74 shuts the transistor off thereby causing its collector potential to drop. This drop in collector potential is applied over leads 82 and 83, through a coupling capacitance 84 to drive the base of the transistor 75 negative with respect to its emitter. Transistor 75 thereupon assumes a conductive condition after its emitter is returned in a positive direction following the drive pulse applied on lead 73. When the next succeeding negative going pulse is impressed over the lead 73 the pulse is applied to the emitters of all the transistors in the distributor, consequently the now conducting transistor 75 is shut off whereupon its collector potential drops to produce a negative going pulse which is applied to the base of the next succeeding transistor 76 to render this transistor conducting following the drive pulse. Similarly as each succeeding negative going pulse is received over the lead 73 the conducting transistor in the distributor is shut off and the next succeeding transistor is rendered conducting.

When the transistor 74 is shut off and its collector potential drops, the decreased potential of the collector is impressed over the leads 82 and 83 to the right-hand side of the diode 51, therefore holding the junction point, positioned to the left of the diode 51, at the low collector potential associated with the collector of the transistor 74. It may be thus appreciated that the negative going operating pulse which is applied to the diode rectifier 49 need only be of sufficient duration to hold the associated junction point at the low potential value until such time as the transistor 74 is shut off to thereafter assume control of imparting a low potential to the rectifier diode 51. In this manner the junction point between the diodes is retained at the low potential value during an entire cycle of the operation of the transistor distributor (see line 83, Fig. 5 which represents the potential on lead 83). Thus, the oscillator will be permitted to function to produce oscillatory outputs which are utilized to step the transistor distributor along through each stage of operation.

When the transistor 74 is again operated, its collector potential rises and this rise in potential is imparted to the rectifier diode 51 to raise the potential of the junction point to a value which is sufficient to raise the base potential of the transistor 53 to a point where said transistor again assumes a conductive condition. Conduction of transistor 53 is accompanied by a drop in its collector potential which drop is applied to the base of the transistor 54 to again render this transistor conducing. Conduction of transistor 54 is followed by a drop in its emitter potential to thereby decrease the potential applied to the base of the transistor 56. Transistor 56 thereupon assumes a conductive condition to complete the low impedance shunt circuit for the resonant circuit associated with the transistor oscillator 57 therefore precluding the further impression of output sinusoidal varying potentials of the output lead 61. Obviously the cessation of output pulses manifests itself in a stopping of the transistor distributor.

When the transistor 74 is conducting, the relatively high collector potential is impressed on a diode rectifier 86 therefore holding a junction point 87 at a relatively high value. Each of the transistors 25 to 29, inclusive, has a lead running from its collector, such leads being designated respectively by the reference numerals 91 to 95, inclusive, to the left-hand side of one of a plurality of rectifier diodes of coincident "and" gates. These diodes are denoted by reference numbers 96 to 100, inclusive. Coincident gates are provided with rectifier diodes 102 to 106, inclusive, which diodes are respectively connected over leads 107 to 111, inclusive, to the collectors of the transistors 76 to 80, inclusive.

In the idle condition with no signal applied to the converter and the transistors 75 to 80 in the non-operating condition both diodes associated with each coincident "and" gate have impressed thereon a relatively low potential; thus, the junction point between each pair of diodes is also at this low potential. The junction points between each pair of rectifier diodes are connected through rectifier diodes 113 to 117, inclusive comprising an "or" gate, to a common output lead 120. In this case the potential at the junction point 123 will be the same value as the most positive input.

Recalling that the junction point 87 is at a relatively high potential it will be noted that this junction point is also connected by means of a rectifier diode 121 to the common output lead 120. Lead 120 is connected to a relatively high impedance source of negative potential 122, consequently a current will flow from junction point 87, through the diode 121, over lead 120, through a junction point 123 to the source of negative battery 122. The flow of current through this circuit is accompanied by a rise in potential of the junction point 123 which rise in potential is impressed upon a lead 124 to the base of a P-type junction transistor 126 to maintain this transistor in a normally conducting condition. The other coincident circuits associated with the lead 120 have their respective junction points at such a low potential value that current cannot flow from these circuits to the lead 120, consequently, it may be appreciated that the conducting transistor 74 controls the potential of the junction point 123. A cut-off condition of transistor 74 is indicative of the generation of a stop impulse or an idle condition on the the outgoing transmitting line.

Attention is directed to the normally conductive transistor 126 wherein its emitter is connected to a source of negative potential which source also supplies negative battery to the collector of an emitter follower transistor 127. The base of transistor 127 is connected through resistances 128 and 129 to a source of positive battery and to negative battery through transistor 126. Consequently, when transistor 126 is conducting the base potential of transistor 127 is at a relatively low value. The emitter of transistor 127 is connected to a source of positive potential which is higher than the base potential; hence the transistor 127 assumes a relatively high conductive state. Conduction of transistor 127 causes the base potential of a transistor 130 to assume a relatively low value with respect to its emitter potential, therefore placing this transistor in a conductive condition. The emitter of transistor 130 is connected through the windings of a polarized relay 131 to ground potential. Current flows from ground through the polarized relay 131, through the emitter of transistor 130 to the source of negative collector potential for this transistor. Current flowing from ground through the polarized relay 131 causes said relay to pull up a contactor 132 into engagement with a marking contact 133 to complete an outgoing transmission line 134, therefore imparting a marking condition on the outgoing line.

When a drive pulse is applied over lead 73 to shut off the transistor 74, the collector potential of this transistor drops and as a result the potential at junction point 87 likewise drops to a value which precludes further flow of current through the diode rectifier 121, consequently the potential of junction point 123 will drop to the relatively low value determined by the source of negative potential 122. It is to be recalled that when transistor 74 is shut off the transistor 75 is rendered conductive; however, this transistor is not connected to any of the coincident "and" gates and the potential of junction point 123 remains at its low value. The drop in potential of junction point 123 is applied to the base of transistor 126 to cause this transistor to assume a non-conducting condition. The collector potential of transistor 126 immediately rises and this rise is impressed through resistance 128 to the base of transistor 127 to also cause this transistor to assume a relatively low conductive condition. Low conduction transistor 127 is accompanied by a rise in its emitter potential which rise is applied to the base of transistor 130 thereby rendering this transistor nonconducting.

The rise in potential imparted through resistance 128 is also imparted on the base of a P-type junction transistor 141 to place this transistor in a highly conductive state because its base is now positive with respect to its emitter potential. Upon transistor 141 becoming highly conductive its emitter potential rises to impart an increased potential on the base of a P-type junction transistor 142 causing said transistor to assume a conductive condition. Operation of transistor 142 completes an energizing circuit which may be traced from the source of positive battery connected to the collector of transistor 142, through the transistor 142, through the polarized relay 131 to ground. Current flow in this direction now reverses the direction of the magnetic field set up in the polarized relay, thus causing the contactor 132 to move from the marking contact into engagement with a spacing contact 143. Opening of the contact 133 also causes the line 134 to open and a spacing condition is thereupon imparted to said outgoing line. This spacing condition, which is maintained during the period that the transistor 75 is conducting, is indicative of a start impulse and will precede each set of signal impulses imparted on the outgoing line 134.

When the transistor 75 operates, its collector potential rises and as a result an increased potential is imparted on a lead 144 to the base of the now conducting transistor 47. It is to be recalled that the conduction of transistor 47 effected a drop in potential between the diode rectifiers 49 and 51 which drop initiated the oscillator into operation. It may be thus observed that the transistor 47 is only maintained conductive for the period required for the oscillator to produce the first output pulse to shut the transistor 74 off and thereafter the transistor 47 is rendered nonconducting and transistor 46 is again rendered conductive preparatory to the next received operating pulse through the diode rectifier 42. It is not necessary that transistor 47 be maintained conductive any longer because the junction point between diodes 49 and 51 is now maintained at a relatively low value due to the low collector potential associated with the now shut off transistor 74.

For purposes of illustration assume that a spacing impulse has been received over lead 12 (see line 12, Fig. 5) from the multiplex receiving distributor. Then the transistor 20 and 25 will be maintained in the condition shown in the drawings, and the relatively low collector potential associated with transistor 25 is impressed over lead 91 to the diode 96. Now when a drive pulse from the oscillator is impressed over lead 73 to shut the transistor 75 off and as a result thereof the transistor 76 assumes a conductive condition, then its collector potential will rise and this rise will be impressed through the lead 107 to the rectifier diode 102. The coincident circuit consisting of the rectifier diodes 96 and 102 are connected to the junction point so that said junction point will assume the lowest potential applied to either of the diodes. Manifestly, the increased potential applied to diode 102 is ineffective to raise the potential of the junction point between the diodes. The net result is that the potential imparted on common lead 120 remains constant to therefore maintain the potential at junction point 123 at its low value. With junction point 123 at the low value the transistors 126, 127, and 130 are cut off and the transistors 141 and 142 are rendered conducting to energize the polarized relay 131 to hold the contactor 132 in engagement with the spacing contact thereby imparting a spacing condition on the outgoing line 134.

For purposes of illustration assume that a marking impulse is applied over lead 13 (see line 13, Fig. 5) then the transistor 21 is rendered nonconducting and the transistor 26 is placed in a conductive condition. With the transistor 26 conducting, the collector potential thereof rises and is impressed over the lead 92 to the diode rectifier 97. When the next drive pulse from the oscillator is impressed over lead 73, the transistor 76 is shut off and the transistor 77 is rendered conducting. Instantaneously therewith the collector potential of transistor 77 rises to impress an increased potential over the lead 108 to the diode 103. It is thus understood that now both the diodes 97 and 103 have relatively high potential applied thereto and as a consequence the junction point therebetween assumes the relatively high value. In this situation current will flow from ground through the diode 114, through the common lead 120, through the junction point 123, to the source of low potential 122. Potential at junction point 123 thereupon rises and as a consequence the transistor 126 is rendered conducting. Conduction of transistor 126 is followed by conduction of transistors 127 and 130 to again complete a circuit which permits current to flow from ground through the windings of the polarized relay 131 to the transistor 130 through the emitter thereof. Inasmuch as the current flow in the polarized relay is reversed, the contactor 132 is now moved into engagement with the marking contact 133 to again impart a marking condition on the outgoing signaling line 134.

When the next impulse from the oscillator is impressed on lead 73, the transistor 77 is shut off and the transistor 78 assumes a conductive state which is accompanied by a rise in its collector potential. The rise in collector potential is impressed over the lead 109 and over a lead 151 to the base of the now conducting transistor 26. It is to be recalled that in the last paragraph it was pointed out that this transistor was operated to indicate the storage of a marking impulse, thus when the base of this transistor rises in potential the transistor assumes a nonconducting condition. Upon transistor 26 assuming a nonconducting condition, its collector potential drops and this drop is impressed over the coupling lead 36 to the base of the nonconducting transistor 21. Appearance of a drop in potential on the base of transistor 21 causes this transistor to again resume its normal conducting condition preparatory to the receipt of the next succeeding impulse being imparted thereto over the lead 13.

It may be comprehended that when the distributor has executed a complete cycle of operation, a signal is impressed on the outgoing line 134 which consists of a start impulse followed by five permutatively arranged marking or spacing impulses and a marking or stop impulse, and that all of the bi-stable storage circuits are sequentially restored to the condition illustrated in the drawing preparatory to the receipt of the next set of signal impulses.

When a signal is received from the multiplex distributor through the connector 11 and represents a blank function, the signal consists of five spacing impulses followed by a control impulse which is invariably of a marking characteristic. The control impulse is imparted to the lead 17 to cause the one shot multivibrator consisting of the transistors 30 and 31, to execute a cycle of operation. Inasmuch as none of the transistors 26 to 29 are operated these transistors cannot effectuate a rise in potential on the common bus lead 37 and hence the transistor 38 cannot be rendered nonconductive and the transistor 39 conductive in preparation for the receipt of an operating pulse over the lead 43. However, the collector of transistor 31 is also connected to the common lead 37 and when said transistor assumes a conductive state its collector potential will rise to impart the positive pulse over the lead 37 to shut the transistor 38 off and put the transistor 39 in a conducting state. The code converter may now function as previously described because the appearance of an operating pulse on lead 43 will cause the character recognizer transistors 39 and 38 to restore to their initial condition thereby producing a pulse which operates the start control transistors 46 and 47 to produce the negative going pulse required to trip the oscillator off. Thereafter, the "and" coincident circuits function as previously described, and the polarized relay will be controlled to impart on the line 134 a no current start impulse followed by five spacing impulses and then a stop or marking impulse. Inasmuch as the one shot multivibrator 30—31 is not connected to the output lead 120 the control pulse coming over the lead 17 is not repeated to the outgoing signaling line 134.

The afore-identified invention was described with respect to a code converter employing particular types of transistors but it is to be understood that the selection of many transistors was merely a matter of choice, that other types of transistors could be utilized by merely making simple changes in biasing and operating potentials.

It is to be understood that the above-described arrangements of apparatus and construction of elemental parts are simply illustrative of an application of the principles of the invention and that many other modifications may be made without departing from the invention.

What is claimed is:

1. In an apparatus for adding start and stop impulses to signals having a predetermined number of permutatively arranged intelligence marking and spacing impulses, a multistage distributor having start and stop stages and a number of stages equal to the number of intelligence impulses in each signal, bi-stable storage circuit means adapted to be operated in accordance with each marking impulse, coincident diode circuit means interconnecting each storage circuit means with an associated stage of the distributor and adapted to be operated by the concurrent operation of the associated storage circuit means and the distributor, a signal generator adapted to generate marking or spacing impulses, a common lead interconnecting each coincident circuit with the signal generator, a source of potential, a resistance interconnected between said lead at a junction point and the source of potential to form an "or" gate with each coincident circuit means, means connected between said stop stage and said junction point to form another of said "or" gates, and means for driving the distributor whereby the operation of any one of said "or" gates causes said signal generator to produce a marking impulse.

2. In a converter for adding start and stop impulses to a signal comprising a fixed number of permutatively arranged intelligence impulses, a start-stop distributor, a start-stop oscillator for driving said distributor, means for shunting said oscillator from operation, a plurality of bi-stable two stage circuits equal in number to the number of intelligence impulses, a normally conductive transistor in one stage and a normally nonconducting transistor in the second stage, means coupling the transistors together in each bi-stable circuit whereby the rendition of a transistor nonconductive by application of an intelligence impulse of a predetermined characteristic renders to associated transistor conductive, a bi-stable character recognizer circuit connected to all said second transistor stages and adapted to be actuated thereby, means for applying an operating pulse to restore said bi-stable recognizer circuit to its initial condition, means operated by the restoration of the recognizer bi-stable circuit for releasing the shunting means for the oscillator, and means controlled by the stop stage of the distributor for holding said releasing means effective during a single cycle of operation of the distributor.

3. In an apparatus for adding start and stop impulses to a signal comprising a fixed number of permutatively arranged intelligence impulses, a multistage distributor having a normally unoperated start stage and a number of other stages equal in number to the number of intelligence impulses, said distributor also including a normally operative stop stage, means for storing the intelligence impulses of a signal, an oscillator for successively shutting off the operative stage of the distributor and rendering the next succeeding stage operative, means for holding said oscillator from operation, a first bi-stage circuit operated by the storage means in response to the storage of a signal therein, means operated by a special pulse for restoring the bi-stable circuit, a second bi-stable circuit operated by the restoration of the first bi-stable circuit to its initial condition, an "or" gate circuit operated by the operation of said second bi-stable circuit for releasing the oscillator holding means, and means controlled by rendering nonoperative said stop stage for maintaining the oscillator holding means in the released condition.

4. In an apparatus as defined in claim 3, means operated by the operation of a predetermined stage of said distributor for restoring the second bi-stable circuit to its initial condition.

5. In a converter for adding start and stop impulses to a signal having a predetermined number of permutatively arranged intelligence impulses, a group of bi-stable transistor circuits for storing each intelligence impulse, a multi-stage start-stop distributor having a transistor in each stage connected to a transistor in the next stage so that only one transistor is conducting at any one time, means for maintaining the stop transistor conductive during idle condition, diode coincident circuits interconnecting said storage circuits with respective ones of said distributor stages, a diode circuit connected to said stop stage, a common potential means forming a gating circuit with all said diode circuits, an output signal generator connected to and operated by said gating circuit, an oscillator for driving said distributor, a coincident "and" gate for holding said oscillator from operation, means controlled by an operating pulse and a signal stored in said bi-stable distributor circuits for initially releasing said holding gate, and means controlled by the stop transistor for holding said gate released during a cycle of operation of said distributor.

6. In a code converter for adding start and stop impulses to a multi-element signal, means for storing each element of a signal, a distributor having separate start and stop stages and a number of signal stages equal to the number of elements in a signal, means for holding the stop stage in an operative condition, an output signal generator connected to a signaling line, means interconnecting the stop stage and the signal generator for impressing a stop condition on the signaling line, an oscillator means adapted upon each operation thereof to render the conducting stage of the distributor non-conducting and the next succeeding stage conductive, a coincident gating circuit for holding said oscillator means from operation, a first means for rendering said coincident gating circuit effective to release said oscillator means whereby said stop stage is rendered nonoperative and said start stage is rendered operative to cause said signal generator to impress a start condition on said line, means controlled by the rendering of the stop stage nonoperative for holding said gating circuit ineffective during a cycle of operation of said distributor, and means actuated in accordance with the condition of the storage means and the operating stages of the distributor for actuating the signal generator to impress signal elements on the line representative of the stored signal elements.

7. In a code converter as set forth in claim 6, means actuated by a predetermined stage of the distributor for rendering the first gating circuit release means ineffective whereby the nonoperative condition of the stop stage holds said gating means ineffective.

References Cited in the file of this patent

UNITED STATES PATENTS

| | | |
|---|---|---|
| 2,536,578 | Slayton | Jan. 2, 1951 |
| 2,642,493 | Locke | June 16, 1953 |
| 2,687,451 | Slayton | Aug. 24, 1954 |
| 2,732,428 | Dain | Jan. 24, 1956 |
| 2,757,237 | Goldman | July 31, 1956 |

OTHER REFERENCES

"Transistor Type Transmitter-Distributor," Western Union Technical Review, January 1956, pp. 120–126 (178–53.1).

"Transistors," by Rufus P. Turner, pp. 82–88 (Div. 51), April 2, 1954.

"Diode Coincidence and Mixing Circuits in Digital Computers," Proceedings of the IRE, vol. 38, issue 5, May 1950, pp. 511–514.

UNITED STATES PATENT OFFICE

CERTIFICATE OF CORRECTION

May 12, 1959

Patent No. 2,886,639

Robert J. Reek

It is hereby certified that error appears in the printed specification of the above numbered patent requiring correction and that the said Letters Patent should read as corrected below.

Column 11, line 17, for "bi-stage" read -- bi-stable --.

Signed and sealed this 1st day of March 1960.

(SEAL)

Attest:

KARL H. AXLINE

Attesting Officer

ROBERT C. WATSON

Commissioner of Patents